United States Patent
Kim et al.

(10) Patent No.: US 7,123,912 B2
(45) Date of Patent: Oct. 17, 2006

(54) METHOD FOR SELECTING WIRELESS COMMUNICATION SYSTEM

(75) Inventors: Hak-Jae Kim, Ichon-shi (KR); Kyung-Ah Chang, Ichon-shi (KR)

(73) Assignee: Curitel Communications, Inc., (KR)

( * ) Notice: Subject to any disclaimer, the term of this patent is extended or adjusted under 35 U.S.C. 154(b) by 302 days.

(21) Appl. No.: 10/749,456

(22) Filed: Dec. 31, 2003

(65) Prior Publication Data

US 2004/0219916 A1    Nov. 4, 2004

(30) Foreign Application Priority Data

Apr. 29, 2003    (KR) ..................... 10-2003-0026991

(51) Int. Cl.
*H04Q 7/20*    (2006.01)
(52) U.S. Cl. .............................. 455/435.3; 455/435.2; 455/435.1; 455/422.1; 455/437; 455/436; 455/434
(58) Field of Classification Search ............. 455/435.3, 455/435.2, 435.1, 422.1, 432.1, 432.3, 433, 455/434, 426.1, 525, 552.1, 515, 553.1, 186.1, 455/437, 436, 407, 406
See application file for complete search history.

(56) References Cited

U.S. PATENT DOCUMENTS

| | | | |
|---|---|---|---|
| 5,428,666 A * | 6/1995 | Fyfe et al. ................... | 455/551 |
| 5,586,338 A * | 12/1996 | Lynch et al. ................. | 455/433 |
| 5,590,397 A * | 12/1996 | Kojima ....................... | 455/417 |
| 5,613,213 A * | 3/1997 | Naddell et al. ........... | 455/435.2 |
| 5,784,693 A * | 7/1998 | Barber et al. ............... | 455/434 |
| 5,870,674 A | 2/1999 | English | |
| 6,173,181 B1 * | 1/2001 | Losh .......................... | 455/434 |
| 6,272,343 B1 * | 8/2001 | Pon et al. .................... | 455/434 |
| 6,397,064 B1 | 5/2002 | Bridges et al. | |
| 6,400,948 B1 * | 6/2002 | Hardin ....................... | 455/434 |
| 6,418,318 B1 | 7/2002 | Bamburak et al. | |
| 6,430,396 B1 | 8/2002 | Bamburak et al. | |
| 6,477,364 B1 | 11/2002 | Otake | |
| 6,546,246 B1 | 4/2003 | Bridges et al. | |
| 6,549,770 B1 | 4/2003 | Marran | |
| 6,584,311 B1 | 6/2003 | Sorenson et al. | |
| 6,603,755 B1 | 8/2003 | Parker | |
| 6,625,451 B1 * | 9/2003 | La Medica et al. ......... | 455/434 |
| 6,655,219 B1 | 12/2003 | Jusa et al. | |
| 6,766,167 B1 * | 7/2004 | Tung et al. .............. | 455/432.1 |
| 6,957,068 B1 * | 10/2005 | Hutchison et al. ....... | 455/435.2 |
| 2004/0063427 A1 * | 4/2004 | Narasimha et al. ......... | 455/434 |
| 2004/0235475 A1 * | 11/2004 | Ishii ........................ | 455/435.3 |

* cited by examiner

*Primary Examiner*—George Eng
*Assistant Examiner*—Khai Nguyen
(74) *Attorney, Agent, or Firm*—Blakely Sokoloff Taylor & Zafman

(57) ABSTRACT

Disclosed is a method for determining a wireless communication system by selecting a wireless communication system without considering a corresponding service area. The method includes the steps of: a) if there are any available wireless communication system having identical system type, selecting a wireless communication system having highest priority in the PRL by searching wireless communication system in the first service area and a plurality of second service areas neighbored to the first service area and comparing priories of wireless communication systems in the first service area and second service areas; and d) if there are not any available wireless communication system having identical system type, selecting a wireless communication system having highest priority in the PRL by searching wireless communication system in a plurality of second service areas neighbored to the first service area.

6 Claims, 3 Drawing Sheets

METHOD FOR SELECTING WIRELESS COMMUNICATION SYSTEM

FIELD OF THE INVENTION

The present invention relates to a method of wireless communication system determination (SD); and, more particularly, to a method for determining a wireless communication system by selecting a wireless communication system having higher priority from a group of available wireless communication systems without considering a corresponding service region of the wireless communication system.

DESCRIPTION OF RELATED ART

In general, a mobile terminal stores a preferred roaming list (PRL) supplied by a vendor. The mobile terminal selects a wireless communication system from a group of wireless communication systems having highest priority listed in PRL. The selected wireless communication system provides mobile originated (MO) and mobile terminated (MT) call services to the mobile terminal.

There are various types of wireless communication systems been developed and introduced such as an analogue-type, digital-cellular-type and PCS-type systems. Here, 'PCS' stands for Personal Communication Services. In addition, an advanced version of an identical type may coexist with a pre-existing type of wireless communication system, thereby necessitating the provision of relevant services by each mobile communication service provider.

On the other hand, the PRL includes system tables and acquisition tables which are distinguished by corresponding service area. In detail, the content of the acquisition table is indexed and classified by acquisition type and includes information such as available service-band, the number of available channels and identifying information relevant to the channels or blocks. The acquisition type indicates that wireless communication type of wireless communication system such as analogue, digital-cellular and PCS systems.

In addition, the system table includes information such as a system identity (SID), network Identity (NID), service availability, regional information, priorities list, acquisition index and roaming indicator. Here, the acquisition index is an indexing assigned to acquisition type of the acquisition table for matching the content of the acquisition table to the content of the system table. The SID is information for identifying a wireless communication system. The SID contains information of system ID with corresponding service area and identical wireless communication system has same SID. The mobile terminal selects available wireless communication system by searching a wireless communication system according to priority of wireless communication systems listed in the system table and acquisition table.

FIG. 1 is a flow chart describing a conventional method for selecting a wireless communication system. Referring to FIG. 1, the detailed description of the method is given as follows.

In the event of a sudden interruption to the connection between a mobile terminal and a wireless communication system due to an electric power failure or the mobile terminal's going into the shadow regions, the mobile terminal searches for a new wireless communication system in the order of priority of wireless communication systems listed in the most recently used (MRU) and acquisition tables. Here, the term 'the shadow regions' is herein being referred to as an area in which the transmission of radio waves is blocked by objects like buildings, mountains and suchlike. The MRU table includes a list of wireless communication systems that are most recently used by a mobile terminal. Also the MRU table includes the content of acquisition tables.

At step S101, a mobile terminal attempts to connect to a base station of corresponding wireless communication system by selecting a wireless communication system according to the MRU and acquisition tables. The term 'connected system' is used hereinafter to mean the wireless communication system currently connected to the mobile terminal. After selecting and connecting to the wireless communication system, at step S102, the mobile terminal receives system information on the connected system, such as the SID and NID.

At step S103, the mobile terminal searches for a wireless communication system matched with received network IDs and system ID found at step S102. If the mobile terminal finds a matched system, which is a wireless communication system matched with received network ID and system ID, the mobile terminal determines whether the matched system has highest priority within corresponding service area of the matched system at step S104. If the matched system has highest priority then the mobile terminal connects to the matched system at step s105. At step S106, if the priority of the matched system is not highest priority in the MRU table and Acquisition table, the mobile terminal searches available wireless communication system having higher priority than the matched system from a group of wireless communication systems list in the MRU table and Acquisition table. At step S107, if there is a wireless communication system having higher priority of the matched system, the mobile terminal selects and connects with the wireless communication system having higher priority. In other words, if the mobile terminal success to connect with available wireless communication system having highest priority, the mobile terminal stay to be connected with the connected wireless communication system and if the mobile terminal fails to connect with wireless communication system having highest priority, the mobile terminal selects a wireless communication system having next highest priority in the PRL list. Furthermore, the mobile terminal also searches available wireless communication system having higher priority, if the connected system does not have highest priority among wireless communication systems listed in the PRL list.

The above-mentioned method is referred to as a better service rescan (BSR). Wireless communication systems are listed in order of priority in the system table of the PRL. A way in which the wireless communication systems are ranked varies widely from vendor to vendor.

The BSR is performed on a regular basis. In other words, the mobile terminal using the BSR is always on the look out for any other available wireless communication system has higher priority.

However, the BSR search an available wireless communication system having higher priority within corresponding service area. Therefore, if there is an available wireless communication system having higher priority in other service area, the BSR cannot find the wireless communication system having higher priority.

On the other hand, in case that the mobile terminal fails to find an available wireless communication system in a corresponding service area, the mobile terminal has no choice but to connect to the first system that becomes available. In other words, compatibility issues go largely unnoticed in this case because the mobile terminal has to be or stay connected to a system in any event to be provided with necessary services. The above-mentioned case is very rare, though a user often ends up paying more fees unduly charged for his mobile terminal being connected with an incompatible system. Furthermore, the searching of a wireless communication system is limited to a corresponding service area in which the mobile terminal is located, resulting in which the mobile terminal cannot search in other service area for any other available wireless communication system having higher priority.

SUMMARY OF THE INVENTION

It is, therefore, an object of the present invention to provide a method for determining a wireless communication system by selecting a wireless communication system having higher priority from a group of available wireless communication systems without considering a corresponding service region of the wireless communication system.

In accordance with an aspect of the present invention, there is provided a method for selecting a wireless communication system, the method including the steps of: a) searching available wireless communication systems within a first service area which the mobile terminal is located; b) determining whether or not there are any available wireless communication systems having identical system type according to preferred roaming list PRL stored in the mobile terminal; c) if there are any available wireless communication system having identical system type as a result of determination of step b), selecting a wireless communication system having highest priority in the PRL by searching wireless communication system in the first service area and a plurality of second service areas neighbored to the first service area and comparing priories of wireless communication systems in the first service area and second service areas; and d) if there are not any available wireless communication system having identical system type as a result of determination of step b), selecting a wireless communication system having highest priority in the PRL by searching wireless communication system in a plurality of second service areas neighbored to the first service area.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
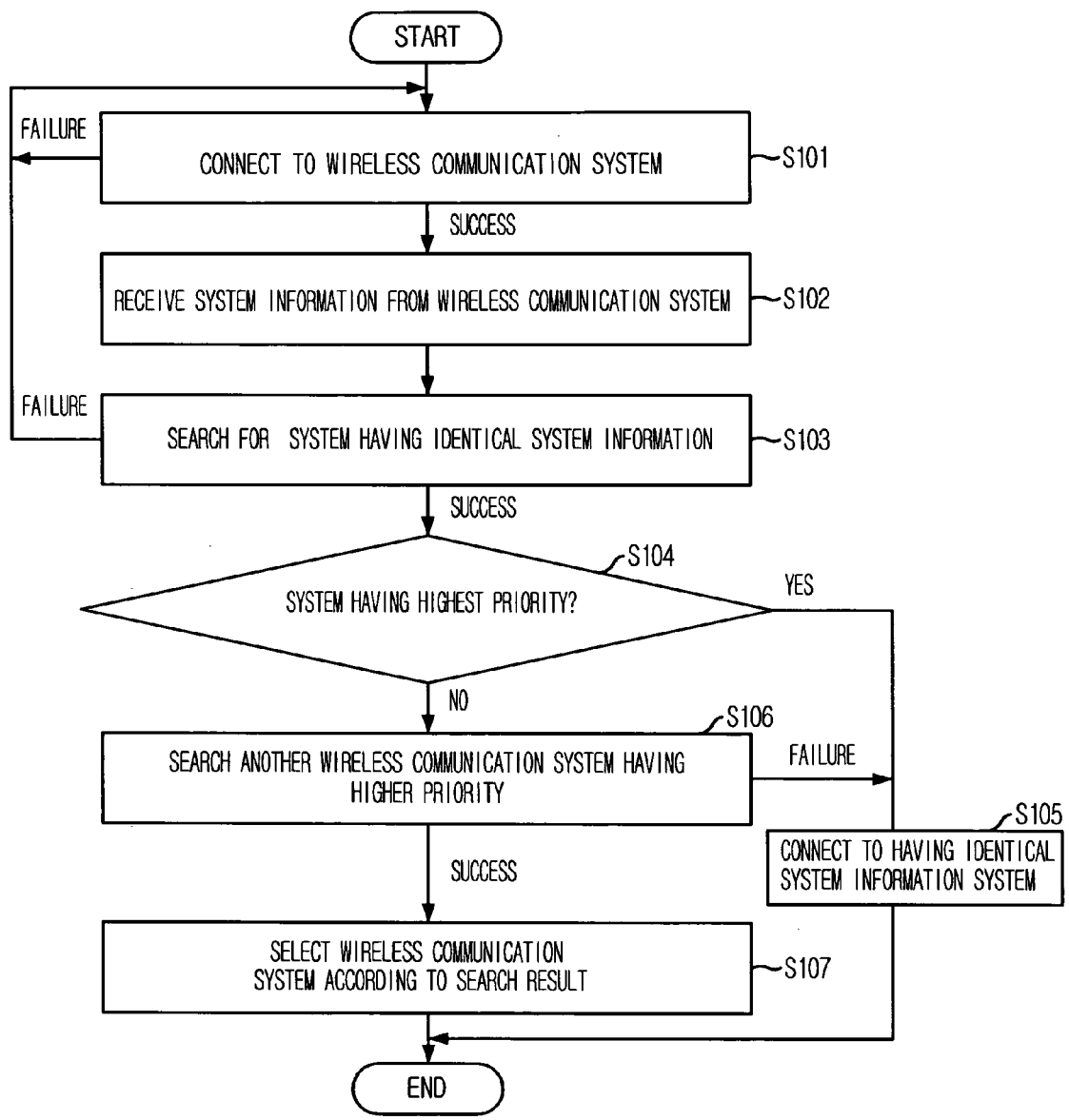
FIG. 1 is a flow chart describing a conventional method for selecting a wireless communication system.
Figure 2:
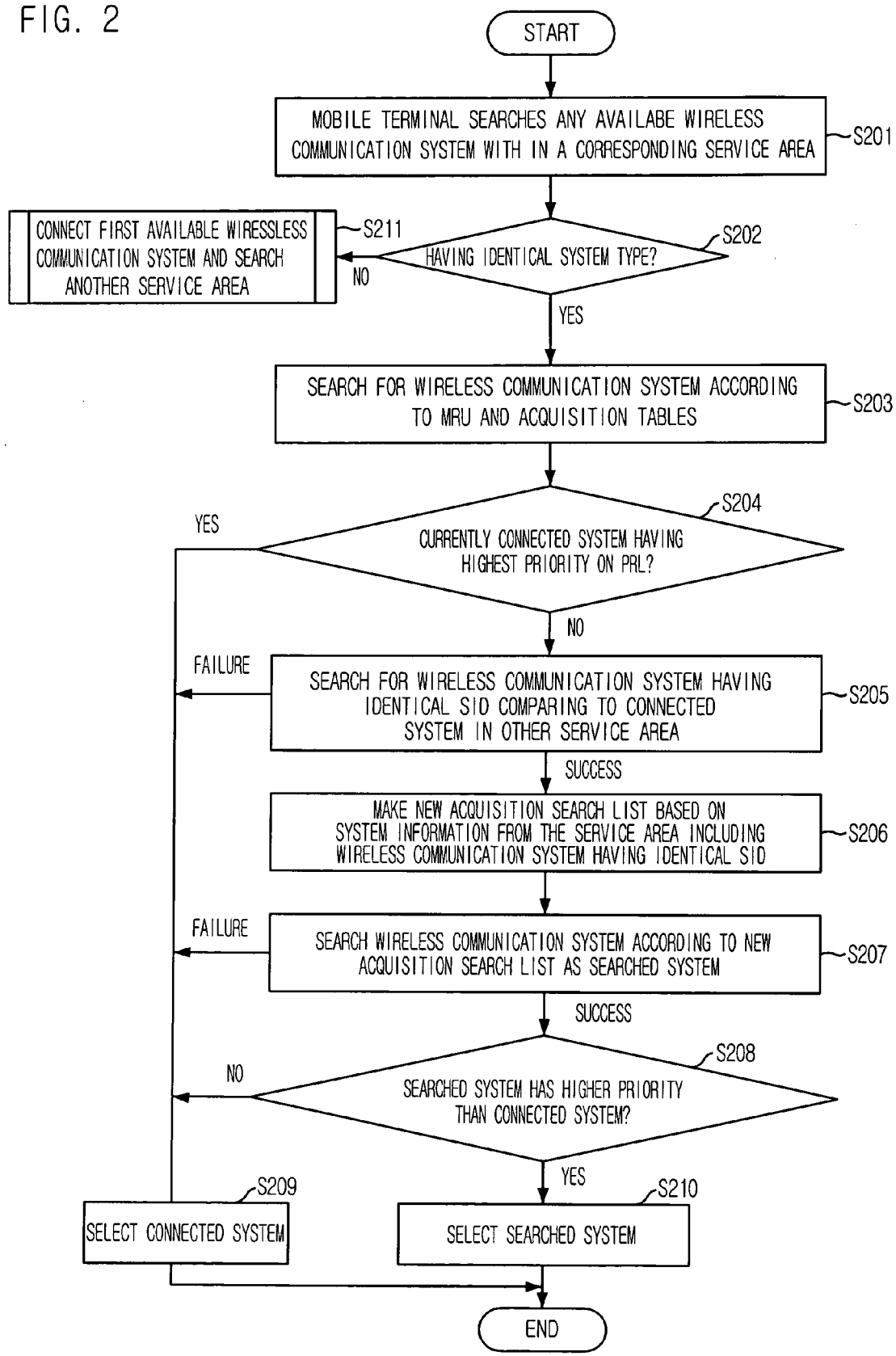
FIG. 2 is a flow chart describing a method for selecting a wireless communication system in accordance with an embodiment of the present invention.

FIG. 2 is a flow chart describing a method for selecting a wireless communication system in accordance with an embodiment of the present invention.

As shown in FIG. 2, at step S201, the mobile terminal searches any available wireless communication systems within a corresponding service area which the mobile terminal is located according to most recently used (MRU) and acquisition tables in the event of a sudden interruption to the connection between a mobile terminal and a wireless communication system due to the mobile terminal's going into the shadow regions. At step S202, the mobile terminal determines whether or not there is any available wireless communication system having identical system type according to PRL stored in the mobile terminal. If there is available wireless communication system having identical system type, the mobile terminal connects with a wireless communication system having highest priority according to the PRL as a connected system among available wireless communication systems having identical system type at step S203.

If not, the mobile terminal connects with first available wireless communication system within a corresponding service area and searches another wireless communication system in another service area at step S211. Detailed explanation of searching and selecting a wireless communication system having identical system type in another service area will be explained in later by referring to FIG. 3.

After connecting with the connected system at step S203, the mobile terminal determines whether or not the connected system has the highest priority on the PRL at step S204. At step S209, if the connected system has highest priority, the mobile terminal keeps the connection with the same system. At step S205, if the priority of the connected system is not highest priority on the PRL, the mobile terminal searches in other service areas for a new available wireless communication system having the same system identity (SID) of the connected system. Hereinafter, the term 'geographic jump' is referred to as the state of being connected to a new system in another service area wherein the new system has the same system identity (SID) as the connected system has as mentioned before.

If a wireless communication system having identical system ID is found, a new acquisition search list is made based on system information available in the service area of the wireless communication system having identical system ID at step S206. The new acquisition search list includes the content of the acquisition table found in the PRL. At step S207, the BSR is performed for finding a wireless communication system according to new acquisition search list. Hereinafter, the term 'connected system' is used herein to mean a wireless communication system to which a mobile terminal is currently being connected. The term 'searched system' is used herein to mean a selected wireless communication system having highest priority in the new acquisition search list made at the step S207. At the step S208, if the searched system has a higher priority than the connected system, the mobile terminal is connected to the searched system. At the step S207, if the connected system has higher priority than the searched system, the mobile terminal attempts to connect to the connected system.

In a meantime, while the mobile terminal is connected to a wireless communication system, the above mentioned method is performed on a regular basis based on the system information in corresponding service area so as to find any other available wireless communication system having higher priority. Therefore, it is determined whether the connected system has highest priority and if the priority of the connected system is not highest, the above mentioned method is performed for selecting a wireless communication system having higher priority.

However, in case of searching available wireless communication system having higher priority in other service area after making new acquisitions search list, if the priority of the connected system is higher than the searched system, the mobile terminal stays with the connected system. And if the priority of the connected system is identical or lower than the searched system of other service area, the searched system of other service area is selected and the mobile terminal connects with the searched system. The priority is predetermined by comparing roam indicator, system types, home system identification (SID) and network identification (NID) stored in numeral assignment module NAM and priority may vary according to wireless communication service providers.

On the other hand, by giving higher priority to the connected system than the searched system of other service area, frequent geographic jumps are prevented for preventing in crease of time to select a wireless communication system having a higher priority.

On the other hand, if there is not any available wireless communication system having identical system type after determination at step S202, the mobile terminal connects with first available wireless communication system within a corresponding service area and searches another wireless communication system in another service area. Detailed explanation of searching and selecting a wireless communication system having identical system type in another service area is explained hereinafter by referring to FIG. 3.

However, an analogue system is an exception in that the mobile terminal continues to search for another wireless communication system if there is not any available wireless communication system having identical system type. Though, the above-mentioned case is very rare. Here, the analogue system doesn't make use of the PRL. In this case, the mobile terminal gets connected to the first system that becomes available and then select a system based on the selection method proposed by the present invention if and when the types of the two systems do not match.

Figure 3:
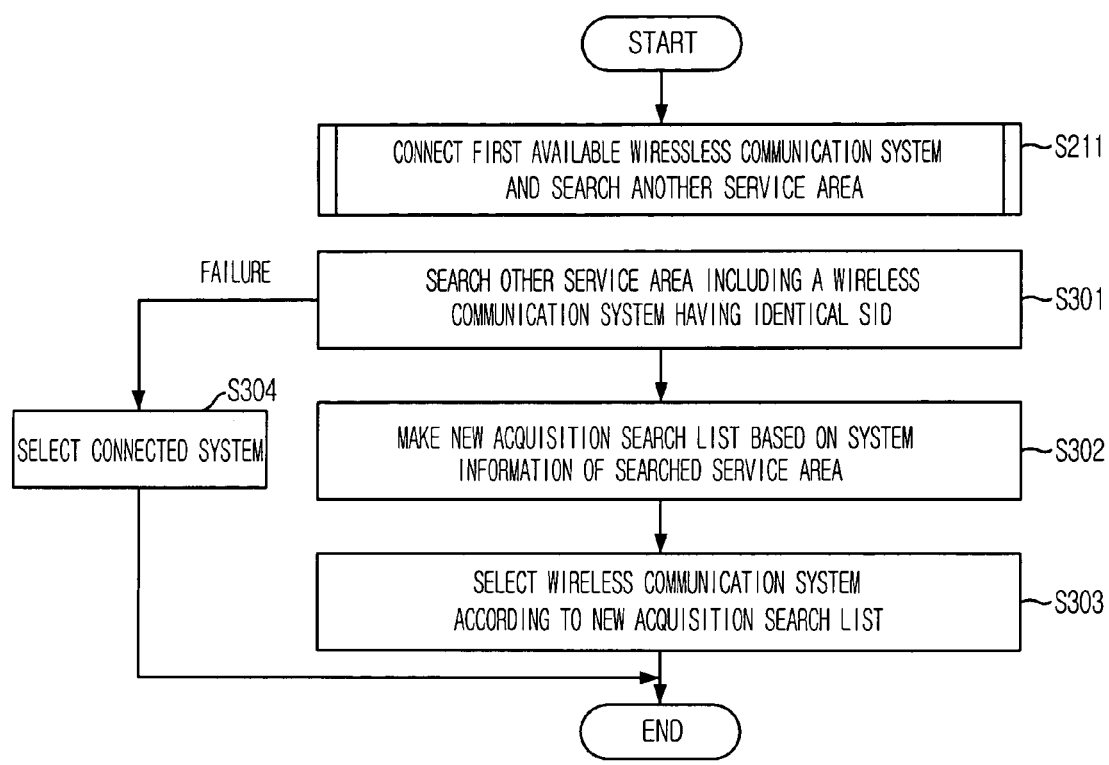
FIG. 3 is a flow chart illustrating a method for searching available wireless communication system having identical system type at step 211 in FIG. 2.

FIG. 3 is a flow chart illustrating a method for searching available wireless communication system having identical system type at step 211 in FIG. 2.

Referring to FIG. 3, after connecting to first available wireless communication system on a temporary basis, the mobile terminal searches a wireless communication system having identical SID which means system type in other service areas at step S301. At step S304, if such a wireless communication system is not to be found, the mobile terminal stay connected to the connected system. At step S302, if the mobile terminal found such a wireless communication system in another service area, a new acquisition search list is made based on system information available in the service area. At step S303, the mobile terminal search and selects a wireless communication system having highest priority according to the new acquisition search list.

Unlike the method for selecting a wireless communication system according to FIG. 2, if the mobile terminal found a new wireless communication system having same system identification SID in other service area, the new wireless communication system is selected and connected to the mobile terminal without considering priorities of the connected system and new wireless communication system. In this case, a criterion, e.g., a roam indicator, a system type and suchlike, by which systems are arranged in order of priority, is not factored into the process of selecting a wireless communication system.

As mentioned above, in the present invention, the mobile terminal determining a wireless communication system by not only searching a wireless communication system having higher priority within a service area of currently connected wireless communication system but also searching a wireless communication system having higher priority in other service area. Therefore, the present invention provide secure and stable environment of wireless communication service to a user.

While the present invention has been described with respect to certain preferred embodiments, it will be apparent to those skilled in the art that various changes and modifications may be made without departing from the scope of the invention as defined in the following claims.

What is claimed is:

1. A method for selecting a wireless communication system, the method comprising:
    searching available wireless communication systems within a first service area which the mobile terminal is located;
    determining whether or not there are any available wireless communication systems having identical system type according to preferred roaming list PRL stored in the mobile terminal;
    if there are any available wireless communication system having identical system type as a result of the determining, selecting a wireless communication system having highest priority in the PRL by searching wireless communication system in the first service area and a plurality of second service areas neighbored to the first service area and comparing priorities of wireless communication systems in the first service area and second service areas; and
    if there are not any available wireless communication system having identical system type as a result of the determining, selecting a wireless communication system having highest priority in the PRL by searching wireless communication system in a plurality of second service areas neighbored to the first service area.

2. The method as recited in claim 1, wherein the selecting a wireless communication system having highest priority in the PRL by searching wireless communication system in the first service area includes:
    temporarily connecting to a wireless communication system by selecting a available wireless communication system having highest priority as a connected system among available wireless communication system having identical system type within the first service area according to the PRL stored in the mobile terminal;
    determining whether or not the connected system has the highest priority on the PRL;
    if the connected system does not have the highest priority on the PRL, searching wireless communication systems having identical system type as a searched system in the second service area, and if the connected system has the highest priority on the PRL, keeping the connection with the connected system;
    if there are wireless communication systems having identical system type in the second service areas, making a updated PRL to include system information of the searched systems in the second service areas, and if there isn't, keeping the connection with the connected system; and
    selecting a wireless communication system having highest priority according to the updated PRL as a selected system and connecting with the selected system.

3. The method as recited in claim 1, wherein the selecting a wireless communication system having highest priority in the PRL by searching wireless communication system in a plurality of second service area includes:
    temporally connecting to first available wireless communication system in the first area;

searching wireless communication systems having identical system type as a searched system in a plurality of the second areas;

if there isn't any wireless communication systems having identical system type in the second areas, keeping connection to the connected system, and if there are wireless communication system having identical system type, making a updated PRL include system information of the searched systems in the second service areas; and selecting a wireless communication system having identical system type according to the updated PRL as a selected system and connecting with the selected system.

4. The method as recited in claim 1, wherein the method is reputedly performed in a predetermined time.

5. The method as recited in claim 1, wherein the priority is predetermined by comparing a roam indicator, system types, home system identification and network identification NID.

6. The method as recited in claim 1, wherein the PRL includes most recently used table and acquisition table.

* * * * *